(12) United States Patent
Erez et al.

(10) Patent No.: US 10,389,561 B2
(45) Date of Patent: Aug. 20, 2019

(54) TRANSMITTER TIME-DOMAIN ESTIMATION AND COMPENSATION OF IQ IMBALANCE

(71) Applicant: Texas Instruments Incorporated, Dallas, TX (US)

(72) Inventors: Shai Erez, Holon (IL); Mor Levi, Gan Yavne (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 42 days.

(21) Appl. No.: 15/662,393

(22) Filed: Jul. 28, 2017

(65) Prior Publication Data

US 2019/0036749 A1 Jan. 31, 2019

(51) Int. Cl.
*H04L 27/26* (2006.01)
*H04L 27/36* (2006.01)
*H04B 1/38* (2015.01)

(52) U.S. Cl.
CPC ...... *H04L 27/2602* (2013.01); *H04L 27/2646* (2013.01); *H04L 27/364* (2013.01); *H04B 1/38* (2013.01); *H04L 27/2671* (2013.01)

(58) Field of Classification Search
CPC . H04L 27/2602; H04L 27/2601; H04L 27/26; H04B 1/38; H04B 7/2608; H04B 7/27; H04B 7/24; H04W 72/0446; H04W 72/044; H04W 72/04
USPC .......................................................... 370/336
See application file for complete search history.

(56) References Cited

U.S. PATENT DOCUMENTS

| | | | | |
|---|---|---|---|---|
| 2011/0211549 | A1* | 9/2011 | Au | H04L 5/003 370/329 |
| 2012/0106686 | A1* | 5/2012 | Zhang | H04L 27/3863 375/349 |
| 2014/0204986 | A1* | 7/2014 | Suissa | H04L 27/0014 375/219 |

(Continued)

OTHER PUBLICATIONS

Ainhoa Rezola, et al., "Non-frequency-selective I/Q Imbalance in Zero-IF Transceivers for Wide-Band mmW Links", ICWMC 2014, The Tenth International Conference on Wireless and Mobile Communications Spain, Jun. 22-26, 2014 pp. 136-141.

(Continued)

*Primary Examiner* — Jeffrey M Rutkowski
*Assistant Examiner* — Luna Weissberger
(74) *Attorney, Agent, or Firm* — Brian D. Graham; Charles A. Brill; Frank D. Cimino

(57) ABSTRACT

A zero-IF transceiver includes a Rx having an IQ receiver path with a digital portion including a modem and a down-converter, and a Tx having an IQ transmit path with a digital portion including a modem for generating a complex and substantially balanced time-domain signal, an IQMM correction block, and an up-converter. An IQMM estimation block is coupled between time-domain parts of the Rx and the Tx modems. The IQMM estimation block is coupled to an input of the IQMM correction block. A loopback path couples the time-domain signal from the Tx to the Rx. The IQMM estimation block receives a first time-domain signal from the Rx modem and the time-domain signal before the IQMM correction block, and estimates in a digital time-domain an IMage Rejection Ratio (IMRR) of the Tx($\vartheta$). The IQMM correction block is for correcting the IQMM to provide an IQ corrected OFDM signal using the $\vartheta$.

20 Claims, 3 Drawing Sheets

(56) References Cited

U.S. PATENT DOCUMENTS

2017/0171791 A1* 6/2017 Li ........................ H04W 24/08
2018/0124616 A1* 5/2018 Jiang .................... H04L 5/0048

OTHER PUBLICATIONS

Jan Tubbax, et al., "Compensation of IQ imbalance in OFDM systems", IEEE International Conference on Communications, Alaska, May 11-15, 2003, pp. 3403-3407.

\* cited by examiner

TRANSMITTER TIME-DOMAIN ESTIMATION AND COMPENSATION OF IQ IMBALANCE

FIELD

Disclosed embodiments relate generally to the field of zero-IF communications, more specifically to correcting the IQ imbalance for zero-IF transmitters.

BACKGROUND

Orthogonal Frequency Division Multiplexing (OFDM) is a method of digital signal modulation in which a single data stream is split across several separate narrowband channels at different frequencies to reduce interference and crosstalk. OFDM is a standard method of encoding digital data on multiple carrier frequencies for broadband wireless systems and is used for Wireless LAN, Fixed Broadband Wireless Access, and Digital Video and Audio Broadcasting.

Zero-IF (also known as homodyne, or synchrodyne) transceivers, where the local oscillator (LO) frequency is equal to the input-carrier frequency, are highly popular for WiFi devices because they enable low-cost OFDM terminals. This is in contrast to the standard superheterodyne receiver where the LO frequency is not equal to the input-carrier frequency so that superheterodyne is accomplished only after an initial conversion to an intermediate frequency. However, the zero-IF architecture introduces an IQ imbalance due mismatches between the parallel sections of the in-phase (I) and quadrature (Q) signal receiver and transmitter paths, which can have a significant impact on signal quality including a degradation in the Image Rejection Ratio (IMRR) from image interference.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize conventional frequency domain solutions for correcting the IQ imbalance of zero-IF transmitters to improve the signal quality of a transmitted OFDM signal being in the frequency domain means an extra FFT and other chip area "heavy" frequency domain modules. Disclosed embodiments provide a relatively simple way for estimating and correcting the IQ imbalance in the transmitter using an indirect adaptive and fully digital time-domain estimation algorithm that includes a new way in the estimation of the impairment.

Disclosed embodiments include a zero-IF transceiver including a receiver (Rx) having an IQ receiver path with a digital portion including a modem and a down-converter, and a transmitter (Tx) having an IQ transmit path with a digital portion including a modem for generating a complex and substantially balanced time-domain signal, an IQ mismatch (IQMM) correction block, and an up-converter. An IQMM estimation block is coupled between time-domain parts of the Rx and the Tx modems. The IQMM estimation block is coupled to an input of the IQMM correction block. A loopback path couples the time-domain signal from the Tx to the Rx. The IQMM estimation block receives a first time-domain signal from the Rx modem and the time-domain signal before the IQMM correction block, and estimates in a digital time-domain an IMRR of the Tx ($\vartheta$).

The IQMM correction block is for correcting the IQMM to provide an IQ corrected OFDM signal using the $\vartheta$.

BRIEF DESCRIPTION OF THE DRAWINGS

Reference will now be made to the accompanying drawings, which are not necessarily drawn to scale, wherein.

DETAILED DESCRIPTION

Figure 1:
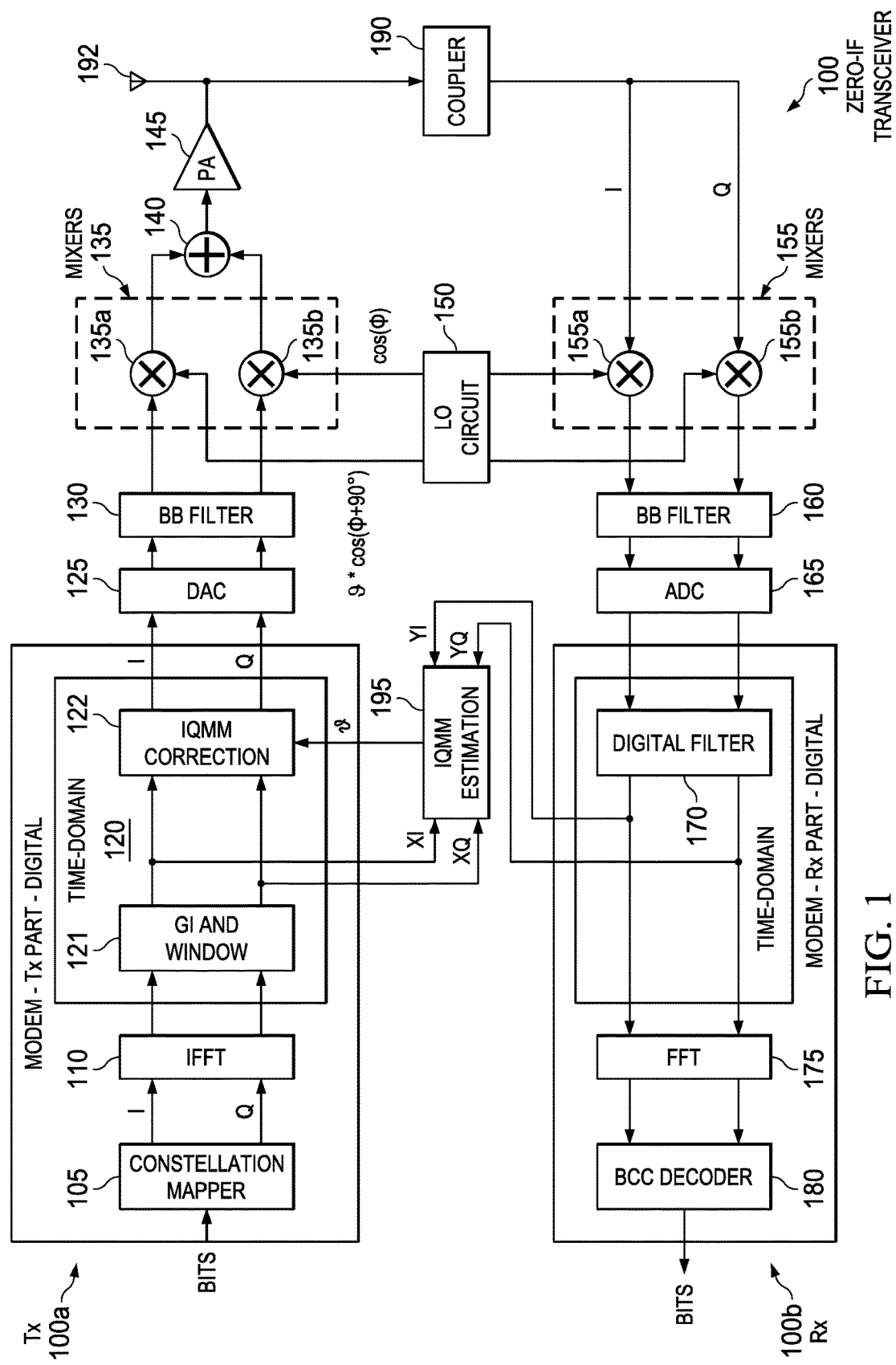
FIG. 1 shows an example zero-IF transceiver implementing disclosed digital time-domain estimation and compensation of the IQ imbalance.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 shows an example zero-IF transceiver 100 including disclosed transmitter implementing disclosed digital time-domain estimation and compensation of IQ imbalance, according to an example embodiment. The zero-IF transceiver 100 includes a Tx 100a and a Rx 100b that share a common antenna 192. Zero-IF transceiver 100 works on practical multi-carrier signals, being signals that would be used in an operational mode, during operational data exchange between radio peers, such as using OFDM modulation.

The OFDM signals (e.g., OFDM data symbols) can be used to support data communication in wireless applications such as PAN networks, WLAN networks (e.g., 802.11x WiFi), WAN networks (e.g., 4G, and LTE cellular networks), WiMAX networks, mobile WiMAX networks, ADSL and VDSL networks, DVB-T and DVB-H networks, and UWB networks. The modulation schemes used can comprise, for example, Phase-Shift Keying (PSK), Amplitude Shift Keying (ASK), or Quadrature Amplitude Modulation (QAM).

The Tx 100a includes a TX digital modem part including a constellation mapper 105 that receives a digital signal shown as bits (e.g., received from a processor) and generates therefrom a modulated I signal for an I path and a modulated Q signal for a Q path. The constellation mapper 105 can employ a constellation table to map each vector into a transmission symbol that is a member of one or more preselected symbol alphabets which themselves can correspond with a symbol constellation. There is then an Inverse Fast Fourier transform (IFFT) block 110, and finally a time-domain block 120 including a guard interval (GI) and window block 121 coupled to an IQMM correction block 122. The IFFT block 110 implements an inverse Fourier transform that converts the signals received from the frequency domain to the time-domain.

In transmitters such as Tx 100*a* using OFDM as a multicarrier modulation technology the OFDM symbol is constructed in the frequency domain by the constellation mapper 105 mapping the input bits on the I and Q components of the symbols such as QAM symbols and then ordering them in a sequence with specific length according to the number of subcarriers in the OFDM symbol. That is by the mapping and ordering process, one may construct the frequency components of the OFDM symbol. To transmit the symbols, the signal must be represented in time-domain. This is accomplished by the IFFT block 110 that provides a time-domain output. The GI and window block 121 performs two tasks. The GI and window block 121 inserts a guard interval which prevents inter-symbol interference due to the multipath channel. The GI and window block 121 also employs windowing by generating a gradual amplitude rise and fall in the symbol boundaries in order to reduce energy at the out of band frequencies.

The IFFT block 110 can further include an Orthogonal frequency-division multiple access (OFDMA) module, where the OFDMA module maps different modulated streams to different subcarrier groups before IFFT processing. In some implementations, the IFFT block 110 may perform an IFFT on outputs of the constellation mapper 105 to generate one or more time-domain signals associated with one or more frequency ranges. In some implementations, the IFFT block 110 can be configured to use one or more FFT bandwidth frequencies such as 20 MHz, 40 MHz, 80 MHz, or 160 MHz. In some implementations, the IFFT block 110 may perform different IFFTs on the modulated data streams according to different FFT bandwidths.

An output of the IQMM correction block 122 is coupled to a digital to analog converter (DAC) block 125 which is coupled to a baseband (BB) filter 130. The DAC block 125 and BB filter 130 convert the time-domain signal received from the modem to an analog signal and shape the analog signal for transmission. The IQMM correction block 122 is shown receiving from a digital time-domain complex representation of an IMRR of the Tx (shown as ϑ) from the IQMM estimation block 195 which is estimated using an equation. The IQMM estimation block 195 receives I and Q time-domain signals shown as YI and YQ from the output of the digital filter 170 in the Rx 100*b* and time-domain I and Q signals shown as XI and XQ from the output of the GI and window block 121 in the Tx 100*a*, and applies an estimating equation. Accordingly, disclosed estimation and compensation of the IQ imbalance for zero-IF transmitters work in the digital time-domain, not in frequency domain as does conventional estimation and compensation of IQ imbalance solutions.

The estimation of the IM provided by the IQMM estimation block 195 and the correction of the IMRR performed by the IQMM correction block 122 can be implemented in either hardware HW or in firmware FW (software). For the HW implementation, a Field Programmable Gate Array (FPGA) or an application specific IC (ASIC) can be used. The BB filter 130 is coupled to a mixer block including (an up-converting) mixer 135*a* for the I path and 135*b* for the Q path. The mixers 135*a*, 135*b* in the mixing block 135 receive 90 degree shifted signals from the local oscillator (LO) 150 and mix these signals with the I and Q signals output by the BB filter 130. Being zero-IF, the LO 150 provides a frequency is identical to, or very close to the carrier frequency of the intended signal. The up conversion up-converts the analog signals to corresponding frequency bands for the antenna 192 to perform transmission.

The actual implementation of the LO 150 generally utilizes a phase lock loop (PLL). An output of each of the mixers 135*a* and 135*b* in the mixer block 135 is coupled to a signal combiner 140 which has its output coupled to the input of a power amplifier (PA) 145 which generally comprises a low noise amplifier. The PA 145 drives an antenna 192. The antenna 192 can be a single shared one for both the Tx 100*a* and Rx 100*b* as shown in FIG. 1, or can be a separate antenna for each of the Tx and Rx paths.

There is a coupler 190 between the Tx path and Rx path which loopbacks the signal from the output of the PA 145 into the I and Q path of the Rx 100*b*. The coupler 190 is an analog component that has some signal attenuation generally comprising a linear passive component that attenuates the signal, which may or may not add a phase to the signal. For example, the coupler 190 can comprise an RF capacitor, or a resistor. This loopback provided by coupler 190 is over a loopback path that is implemented prior to the antenna 192.

In operation the Rx 100*b* receives incoming RF signals in one or more frequency ranges over one or more communication channels. The frequency range can include a group of OFDM sub-carriers. The Rx 100*b* performs signal processing to process received data packets in a reverse order to the Tx 100*a* to recover the information therein. The Rx 100*b* includes a down converting mixer block 155 coupled to the coupler 190, a BB filter block 160 coupled to the output of each of the mixers 155*a* and 155*b* in the mixer block 155. The BB filter 160 and analog to digital converter (ADC) block 165 filter the down-converted signal and transforms it into digital data sequence. The ADC block 165 is coupled to the digital filter 170 of the modem Rx part. The Rx modem part also includes an FFT 175 that converts the I and Q signals received from digital time-domain to frequency domain, and a decoder 180 shown as a Binary Convolutional Code (BCC) decoder that outputs a decoded a bit stream.

One example equation for estimating ϑ is as follows:

$$\hat{\vartheta} \cong \frac{\sum_{n=1}^{N} x_n \cdot y_{RX_n}}{\sum_{n=1}^{N} x_n^* \cdot y_{RX_n}} + \frac{\sum_{n=1}^{N} x_n^2}{\sum_{n=1}^{N} |x_n|^2}$$

wherein $x_n$ is the modem original BB transmitted signal after the GI and window block 121 in FIG. 1 shown as XI and XQ. $y_{RX_n}$ is the distorted transmitted BB signal after being received back to the modem after the digital filter 170 in FIG. 1 shown as YI and YQ. N is a packet length. The examples section described below shows derivation of this equation.

The above estimation equation or possibly a related variant (of this equation utilized by disclosed zero-IF transceivers provide a chip (e.g., silicon) cost-effective operation as they only need about 3 k gates of processing logic. The above equation is cost effective as it does not require an additional FFT block, such as required by conventional frequency domain IQMM correction solutions. An FFT block is known to be expensive in terms of die area. It can also be seen when considering the amount of multiplications per cycle in this equation above is only 2, and no memory is required. Whereas the conventional FFT solution is computationally much heavier, requiring a large memory and its number of calculations is proportional to the number of frequency bins (FFT size, which is typically 256 for IEEE 802.11 standards). For example, a 256 FFT requires 4 multipliers and a memory size of 256 words (where a word is comprised of a pair of I and Q samples).

Figure 2:
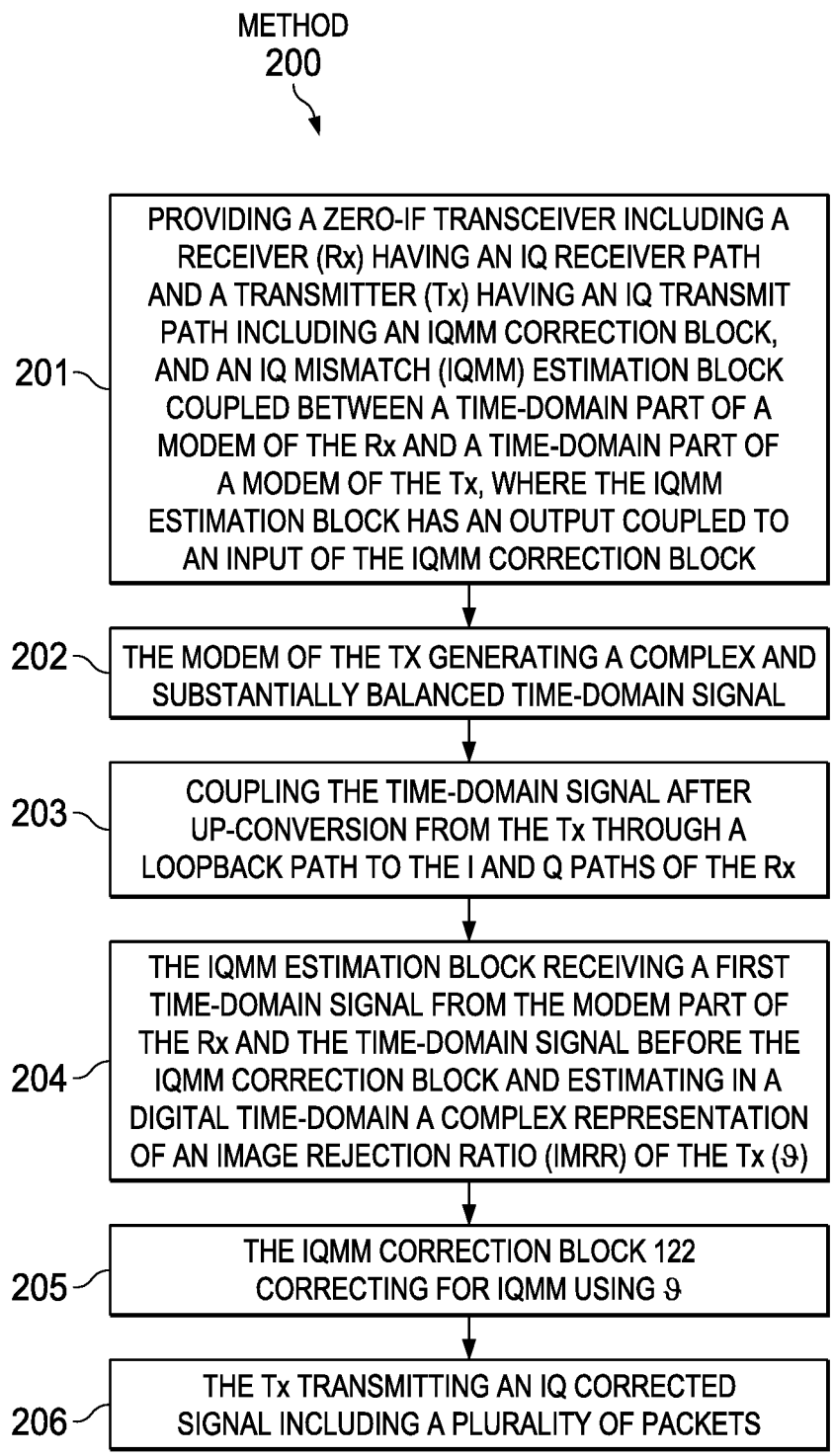
FIG. 2 is a flowchart for an example method of compensating an IQ imbalance for a zero-IF transceiver, according to an example embodiment.

FIG. 2 is a flowchart for an example method 200 of digital time-domain estimation and compensation of IQ imbalance for a zero-IF transceiver, according to an example embodiment. Step 201 comprises providing a zero-IF transceiver including a Rx having an IQ receiver path and a Tx having an IQ transmit path including an IQMM correction block. An IQMM estimation block is coupled between a time-domain part of a modem of the Rx and a time-domain part of a modem of the Tx, where the IQMM estimation block 195 has an output coupled to an input of the IQMM correction block 122.

Step 202 comprises the modem of the Tx generating a complex and substantially balanced time-domain signal, such as an OFDM signal. Most current wireless communication standards that use zero-IF transmitters use OFDM modulated signals. However, disclosed embodiments are not limited to OFDM signals. For example, non-OFDM signals such as continuous waveform (CW), and white noise an also be used since disclosed algorithms can work on any practical time-domain signal.

As used herein the "substantially" used in a "substantially balanced time-domain signal" refers to the signal being balanced in its I and Q components meaning I and Q are both zero mean value±1%, orthogonal to one another ±1°, and with the same energy (E)±1%. In equation form a fully balanced time-domain signal has the auto correlation of I and Q equal $E(I^*Q)=0$, $E(I^2)=E(Q^2)$, and $E(I)=E(Q)=0$.

Step 203 comprises coupling the OFDM signal after up-conversion from the Tx through a loopback path (see coupler 190 in FIG. 1) to the I and Q paths of the Rx shown in FIG. 1 coupled to the mixers 155. Step 204 comprises the IQMM estimation block 195 receiving a first time-domain signal from the modem part of the Rx and the time-domain signal before the IQMM correction block 122 and estimating n a digital time-domain a complex representation of an IMRR of the Tx ($\vartheta$) using an equation. In FIG. 1 the IQMM estimation block 195 is shown receiving I and Q time-domain signals shown as YI and YQ from the output of the digital filter 170 in the Rx 100b, and time-domain I and Q signals shown as XI and XQ from the output of the GI and window block 121 in the Tx 100a.

The calculating is in essentially real-time (only the computational time), where is calculated in the digital time-domain. Step 205 comprises the IQMM correction block 122 correcting for IQMM using $\vartheta$. The IQMM correction block 122 uses the received $\vartheta$ parameter from the IQMM estimation block 195 which IQMM corrects the transmission, which thus performs IQMM correction in the digital time-domain. In step 206, after the correcting, the Tx transmits an IQ corrected signal including a plurality of packets. Therefore, as described above, disclosed estimation and compensation of IQ imbalance for zero-IF transmitters works in the digital time-domain, not in the frequency domain (e.g., through analog AM detector) as does conventional estimation and compensation of IQ imbalance solutions. Steps 202 to 204 can be optionally reiterated using a form of averaging, such as an adaptive least mean squares (LMS) function which sums each $\vartheta$ iteration after multiplying it by a pre-defined convergence coefficient.

Figure 3:
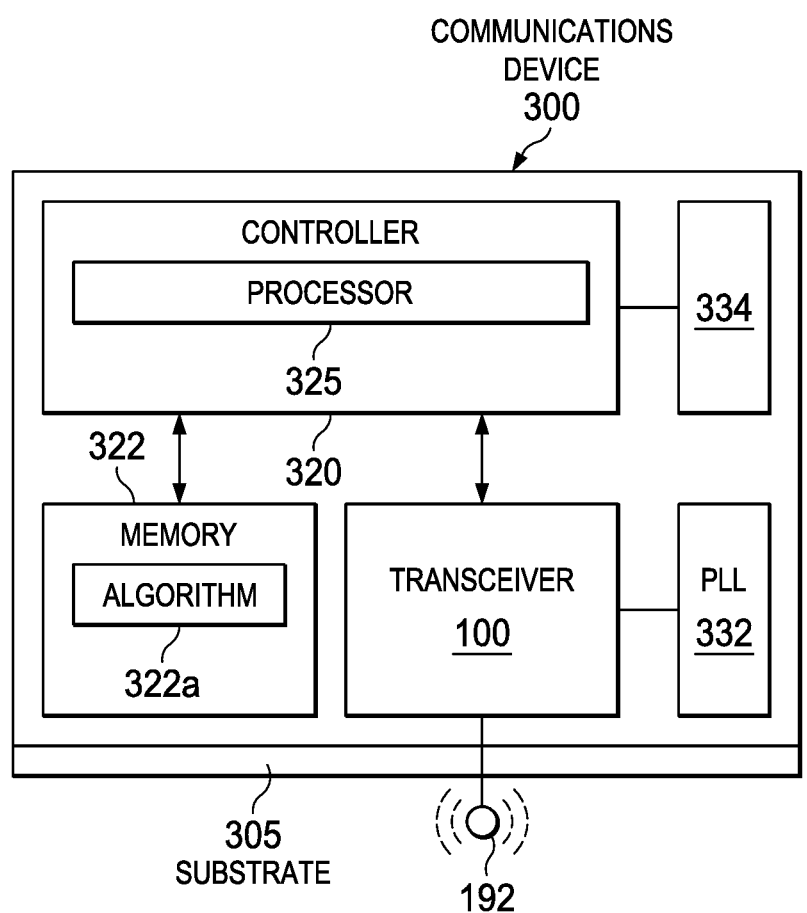
FIG. 3 is a block diagram schematic of an example communication device including the zero-IF transceiver shown in FIG. 1.

FIG. 3 is a system block diagram representation of an example communications device 300 that generally conforms to an IEEE 802.11 communications standard. The communications device 300 is shown formed as an integrated circuit (IC) on a substrate 305 that has a semiconductor surface (e.g., a silicon substrate, such as a bulk silicon substrate or silicon epi on a bulk silicon substrate). In operation the communications device 300 communicates in a communications network such as WiFi or Long-Term Evolution (LTE).

The communications device 300 comprises a controller 320 including a processor 325, a memory 322 including software stored in the memory for a disclosed IQMM estimation and correction algorithm 322a, and a zero-IF transceiver 100 coupled to the processor 325 and to an antenna 192. The processor 325 can comprise a digital signal processor (DSP) or a microcontroller.

The memory 322 is more generally configured to store information including data, instructions, or both data and instructions. The memory 322 may be any storage medium accessible by the controller 320, such as a read only memory (ROM), a random access memory (RAM), a register, cache memory, or magnetic media device such as internal hard disks and removable disks. A phase lock loop (PLL) 332 is also provided for providing LO signals for purposes including signal mixing and frequency synthesis.

The communications device 300 is also shown including hardware comprising digital logic 334 that can also be provided for implementing a disclosed IQMM estimation and correction algorithm. However, as noted above, the IQMM estimation and correction algorithm may also be implemented by software (firmware) stored in a memory such as memory 322 by the processor 325.

The controller 320 is coupled to the memory 322 and to the transceiver 100. In some implementations, the zero-IF transceiver 100 comprises baseband units (not shown) and analog units (not shown) to transmit and receive RF signals. See FIG. 1 described above for example zero-IF transceiver 100 specifics. The baseband unit may comprise hardware to perform baseband signal processing including digital signal processing, coding and decoding, modulation, and demodulation. The analog unit may comprise hardware for ADC block 165, a DAC block 125, filtering 130, 160, gain adjusting, and a mixer block 135 for signal up-conversion and a mixer block 155 for signal down-conversion. The analog unit in the Rx may receive RF signals from an access point and down-convert the received RF signals to baseband signals to be processed by the baseband unit, or receive baseband signals from the baseband unit and up-convert the received baseband signals to RF wireless signals for uplink transmission. The analog unit comprises a mixer 135 to up-convert the baseband signals and mixer 155 to down-convert the RF signals with a carrier signal oscillated at a radio frequency of the system. The radio frequency may be 2.4 GHz or 5 GHz utilized in WLAN systems conforming to 802.11a/b/g/n/ac/ax specifications, or other specifications depending on future radio access technology.

Advantages of disclosed digital time-domain estimating and compensating an IQ imbalance for IF-transceivers include much more accurate and agnostic to LO leakage with respect to conventional solutions based on analog AM detectors. Disclosed solutions work on practical OFDM signal, while some other solutions use non-OFDM stimulus signal (such as a Carrier Wave). The non-OFDM stimulus signals has disadvantages including possibly triggering Radar detectors (as a result AP will switch channel for long time), may consume extra power for calibration, less accurate since impairments could be dependent by signal characteristics. The disclosed digital time-domain estimating and compensating an IQ imbalance for IF-transceiver solution compared to conventional frequency domain solutions enables one to run a real-time IQMM estimation over transmitted operational packets without any significant extra hardware. As described above, conventional frequency domain solutions being in the frequency domain means an extra FFT and other chip area "heavy" frequency domain modules.

EXAMPLES

Disclosed embodiments are further illustrated by the following specific Examples, which should not be construed as limiting the scope or content of this Disclosure in any way.

The standard RF model: $y_{TX}(t)=Re\{y_{BB} \cdot e^{j\omega_c t}\}$, where $y_{BB}$ is a complex envelope baseband signal distorted with IQMM impairment.

$$y_{BB} = Re\{x\} \cdot ae^{j\phi} + j \cdot Im\{x\} =$$

$$ae^{j\phi} \cdot \frac{[x+x^*]}{2} + \frac{[x-x^*]}{2} = x\frac{[ae^{j\phi}+1]}{2} + x^*\frac{[ae^{j\phi}-1]}{2}$$

$$y_{BB} \triangleq \alpha x + \beta x^*$$

ø—represent phase imbalance of the practical system
α—Represents the gain imbalance of the practical system
in an ideal system α=1; ø=0

$$y_{RX} = y_{BB} \cdot G = G \cdot (\alpha x + \beta x^*)$$

$$y_{RX} \triangleq \theta_1 x + \theta_2 x^*$$

G—represents the complex gain (amp+phase) of the RX path
The estimation algorithm estimates the IQMM ratio of:

$$\vartheta \triangleq \frac{\theta_2}{\theta_1} = \frac{\beta}{\alpha}$$

It can be shown that $\vartheta$ can be estimated and approximated by the following silicon cost-effective equation/operation:

$$\hat{\vartheta} \cong \frac{\sum_{n=1}^{N} x_n \cdot y_{RX_n}}{\sum_{n=1}^{N} x_n^* \cdot y_{RX_n}} + \frac{\sum_{n=1}^{N} x_n^2}{\sum_{n=1}^{N} |x_n|^2}$$

X, N is the packet length, $y_{RX}$ is the transmitted signal with IQMM impairment, received back and down-converted to BB. $y_{RX}$-$n^{th}$ is sample of $y_{RX}$. This algorithm can be expanded to be iterative as described above to provide even better IQMM correction performance.

Assuming an estimate $\hat{\vartheta}$ which is the ratio $\beta/\alpha$ one can use the following correction scheme.

$$x_{corr} = x - \hat{\vartheta} x^* = x - \hat{\beta}/\hat{\alpha} x^*$$

$$y_{BB} = \alpha x_{corr} + \beta x^*_{corr}$$

α and β represent the actual TX chain IQ imbalance.
A proof is shown below:

$$y_{BB} = \alpha[x - \hat{\vartheta} x^*] + \beta[(x - \hat{\vartheta} x^*)^*] = x[\alpha - \beta \cdot \hat{\vartheta}^*] + x^*[\beta - \alpha \hat{\vartheta}] =$$

$$x[\alpha - \beta \cdot \hat{\vartheta}^*] + \frac{\alpha}{\alpha} x^*[\beta - \alpha \hat{\vartheta}] = \alpha \cdot x[1 - \vartheta \cdot \hat{\vartheta}^*] + \alpha \cdot x^*[\vartheta - \hat{\vartheta}]$$

Assuming perfect estimation $\hat{\vartheta}=\vartheta$, the IQ imbalanced is cancelled.

$$y_{BB} = \alpha[1-|\vartheta|^2] \cdot x$$

The factor $\alpha[1-|\vartheta|^2]$ is a complex gain, with an amplitude close to 1 and with a random phase, so that it does not introduce any IQ imbalance.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:
1. A method of compensating an in-phase/quadrature (IQ) imbalance, comprising:
   receiving a first set of time-domain signals from a receiver (Rx) having in-phase and quadrature receiver paths by an in-phase/quadrature mismatch (IQMM) estimation block coupled to said in-phase and quadrature receiver paths of said Rx;
   receiving a second set of time-domain signals from a transmitter (Tx) having in-phase and quadrature transmit paths including an IQ mismatch (IQMM) correction block, by said IQMM estimation block further coupled to said in-phase and quadrature transmit paths of said Tx;
   said IQMM estimation block estimating in a digital time-domain an IMage Rejection Ratio (IMRR) of said Tx based on said first and second sets of time-domain signals;
   said IQMM correction block correcting for an IQ mismatch (IQMM) using said IMRR; and
   after said correcting, said Tx transmitting an IQ corrected signal including a plurality of packets using said IMRR.

2. The method of claim 1, further comprising repeating at least once said receiving of said first and second sets of time-domain signals and said estimating to generate an iterated said IMRR before said correcting and said Tx transmitting.

3. The method of claim 1, wherein said IQMM estimation block and said IQMM correction block are both implemented in hardware.

4. The method of claim 1, wherein said IQMM estimation block and said IQMM correction block are both implemented in software.

5. The method of claim 1, wherein said IQMM correcting is performed while said transmitting said IQ corrected OFDM signal.

6. The method of claim 1, wherein said IMRR is estimated based on:

$$IMRR \cong \frac{\sum_{n=1}^{N} x_n \cdot y_{RX_n}}{\sum_{n=1}^{N} x_n^* \cdot y_{RX_n}} + \frac{\sum_{n=1}^{N} x_n^2}{\sum_{n=1}^{N} |x_n|^2}$$

wherein said $x_n$ represents a baseband representation of the second set of time-domain signals as received by said IQMM correction block, and wherein said $y_{RX_n}$ is a baseband representation of the first set of time domain signals as received by said IQMM correction block.

7. The method of claim 1, wherein said method is performed in real-time.

8. The method of claim 1, wherein said time-domain signal comprises an Orthogonal Frequency Division Multiplexed (OFDM) signal.

9. A zero-intermediate frequency transceiver, comprising:
a receiver (Rx) including a digital portion, an analog portion, and in-phase and quadrature (IQ) receiver paths extending through said digital portion and said analog portion; and
a transmitter (Tx) including a digital portion, an analog portion that is adapted to be coupled to an antenna, and IQ transmit paths extending through said digital portion and said analog portion;
said analog portion of said Rx including a down-converter,
said analog portion of said Tx including an up-converter, and
said digital portion of said TX including an IQMM correction block;
an IQ mismatch (IQMM) estimation block coupled to said Tx to receive time-domain transmitter signals from said IQ transmit paths and coupled to said Rx to receive time-domain receiver signals from said IQ receiver paths, said IQMM estimation block having an output coupled to an input of said IQMM correction block; and
said IQMM estimation block for estimating an IMage Rejection Ratio (IMRR) of said Tx; and
said IQMM correction block for correcting said Tx to provide an IQ corrected signal using said IMRR.

10. The zero-IF transceiver of claim 9, wherein said IQMM estimation block and said IQMM correction block are both implemented in hardware.

11. The zero-IF transceiver claim 9, wherein said IQMM estimation block and said IQMM correction block are both implemented in software.

12. The zero-IF transceiver claim 9, wherein said IQMM estimation block and said IQMM correction block are configured to be operable for said correcting while said Tx is transmitting said IQ corrected signal.

13. The zero-IF transceiver claim 9, wherein said zero-IF transceiver is formed on an integrated circuit (IC) comprising a substrate having a semiconductor surface.

14. The zero-IF transceiver claim 9, wherein said IQMM estimation block is for estimating said IMRR based on:

$$IMRR \cong \frac{\sum_{n=1}^{N} x_n \cdot y_{RX_n}}{\sum_{n=1}^{N} x_n^* \cdot y_{RX_n}} + \frac{\sum_{n=1}^{N} x_n^2}{\sum_{n=1}^{N} |x_n|^2}$$

wherein said $x_n$ represents a baseband representation of the time-domain transmitter signals as received by said IQMM correction block, and wherein said $y_{RX_n}$ represents a baseband representation of the time-domain receiver signals as received by said IQMM correction block.

15. The zero-IF transceiver claim 9, wherein said time-domain signal comprises an Orthogonal Frequency Division Multiplexing (OFDM) signal.

16. A communications device, comprising:
a transceiver that includes:
a receiver that includes:
a receiver path that includes an in-phase path and a quadrature path;
a transmitter that includes:
a transmitter path that includes an in-phase path and quadrature path, wherein the transmitter path includes an In-phase/Quadrature Mismatch (IQMM) correction block; and
an IQMM estimation block coupled to the receiver path to receive a first set of in-phase and quadrature signals in a time domain and coupled to the transmitter path to receive a second set of in-phase and quadrature signals in the time domain, wherein:
the IQMM estimation block is to determine an IMage Rejection Ratio (IMRR) based on summation of a product of the first and second sets of in-phase and quadrature signals;
the IQMM estimation block is further coupled to the IQMM correction block to provide the IMRR to the IQMM correction block; and
the IQMM correction block is coupled to apply a correction to the transmitter path based on the IMRR.

17. The communications device of claim 16, wherein the IQMM correction block is coupled to apply the correction to a time-domain portion of the transmitter path.

18. The communications device of claim 16, wherein the second set of in-phase and quadrature signals is an input to the IQMM correction block, and wherein said IQMM estimation block is to determine the IMRR further based on:

$$IMRR \cong \frac{\sum_{n=1}^{N} x_n \cdot y_{RX_n}}{\sum_{n=1}^{N} x_n^* \cdot y_{RX_n}} + \frac{\sum_{n=1}^{N} x_n^2}{\sum_{n=1}^{N} |x_n|^2}$$

wherein said $x_n$ represents the second set of in-phase and quadrature signals as input to the IQMM correction and wherein said $y_{RX_n}$ represents the second set of in-phase and quadrature signals as input to the IQMM correction block.

19. The communications device of claim 16, wherein the first set of in-phase and quadrature signals is an input to a fast Fourier transform block.

20. The communications device of claim 16, wherein the IQMM correction block is arranged in the transmitter path after an inverse fast Fourier transform block.

* * * * *